United States Patent [19]

White, Jr. et al.

[11] Patent Number: 5,026,327
[45] Date of Patent: Jun. 25, 1991

[54] BELT CONSTRUCTION, ROTATABLE PULLEY AND COMBINATION THEREOF AND METHODS OF MAKING THE SAME

[75] Inventors: Jack D. White, Jr.; Clinton L. Bishop, both of Springfield, Mo.

[73] Assignee: Dayco Products, Inc., Dayton, Ohio

[21] Appl. No.: 597,960

[22] Filed: Oct. 15, 1990

Related U.S. Application Data

[62] Division of Ser. No. 524,592, May 17, 1990, Pat. No. 4,981,462.

[51] Int. Cl.$^5$ .............................................. F16H 7/02
[52] U.S. Cl. ..................................... 474/152; 474/153
[58] Field of Search ............... 474/152, 153, 204, 205, 474/238; 29/159 A

[56] References Cited

U.S. PATENT DOCUMENTS

| | | | |
|---|---|---|---|
| 2,987,932 | 6/1961 | Szonn | 474/153 |
| 4,605,389 | 8/1986 | Westhoff | 474/153 |
| 4,671,224 | 2/1986 | Arinaga | 474/153 |

*Primary Examiner*—Thuy M. Bui
*Attorney, Agent, or Firm*—Joseph V. Tassone

[57] ABSTRACT

An endless power transmission belt construction, a rotatable pulley therefor, a combination of the belt construction and pulley and methods of making the same are provided, the belt construction having opposed side edges and having an inner surface defining a plurality of longitudinally disposed and alternately spaced apart like projections and grooves for meshing with an outer peripheral ribbed surface of a rotatable pulley, each projection of the belt construction having a generally V-shaped transverse cross-sectional configuration defined by tow substantially straight side edges that converge from the respective apexes of the grooves of the belt construction that are on opposite sides of that projection to an apex of that projection, the side edges of each projection of the belt construction defining an angle of approximately 60° therebetween with the thickness of the belt construction being substantially the same as the thickness of a similar belt construction wherein the angle is approximately 40° and with the distance between the center lines of the grooves of the belt construction that are on opposite sides of that projection being larger than such distance of the similar belt construction.

2 Claims, 3 Drawing Sheets

BELT CONSTRUCTION, ROTATABLE PULLEY AND COMBINATION THEREOF AND METHODS OF MAKING THE SAME

This is a division of application Ser. No. 524,592, filed May 17, 1990, now U.S. Pat. No. 4,981,462.

BACKGROUND OF THE INVENTION

1. Field of the Invention

This invention relates to a new endless power transmission belt construction and to a rotatable pulley means for such a belt construction as well as to the combination of the belt construction and pulley means and to methods of making the same.

2. Prior Art Statement

It is known to provide the combination of an endless power transmission belt construction having opposed side edge means and having an inner surface means defining a plurality of longitudinally disposed and alternately spaced apart like projections and grooves, and a rotatable pulley means having an outer peripheral ribbed surface means meshing with a portion of the inner surface means of the belt construction and defining a plurality of longitudinally disposed and alternately spaced apart like projections and grooves that respectively have portions thereof for serially meshing respectively with cooperating portions of the grooves and projections of the belt construction, each projection of the belt construction having a generally V-shaped transverse cross-sectional configuration defined by two substantially straight side edges that converge from the respective apexes of the grooves of the belt construction that are on opposite sides of that projection to an apex of that projection. For example, see FIG. 2 of this application as well as the U.S. Pat. No. to Adams, Jr., 2,728,239; the U.S. Pat. No. to Semin et al, 3,643,518; the U.S. Pat. No. to Fisher et al, 3,951,006; the U.S. Pat. No. to Speer, 4,047,446; the U.S. Pat. No. to Fischer, 4,330,287; the U.S. Pat. No. to Tanaka et al, 4,525,158 and the U.S. Pat. No. to Hull, 4,647,278.

It is also known to provide a belt construction wherein the same has opposed side edges making an angle of approximately 60° therebetween with such belt construction having been cut from a belt sleeve having a plurality of V-shaped projections extending therefrom with each V-shaped projection having the opposed side edges thereof defining an angle of approximately 60° therebetween. For example, see the U.S. Pat. No. to Haines, Jr., et al, 3,138,962, and the U.S. Pat. No. to Russ et al, 3,200,180.

SUMMARY OF THE INVENTION

It is one feature of this invention to provide a new endless power transmission belt construction that has a ribbed inner surface means that cooperates with an outer ribbed surface means of a pulley means in a manner to overcome some of the many problems associated with the prior known belt constructions wherein the included angle between the side edges of each of the V-ribs thereof is approximately 40°.

In particular, it is believed according to the teachings of this invention that by making the included angle between the side edges of each V-rib of a belt construction of approximately 60° while maintaining the same thickness as the belt construction that had an included angle of 40°, belt noise will be reduced, the accumulation of material between the ribs thereof will be reduced and tension decay of the belt construction when used on drives not having a belt tensioner will be reduced.

In addition, it is believed that the pulley means utilized with such a belt construction of this invention can have the cooperating ribbed surface thereof changed to accommodate the ribs of the belt constructions of this invention.

For example, one embodiment of this invention provides an endless power transmission belt construction having opposed side edge means and having an inner surface means defining a plurality of longitudinally disposed and alternately spaced apart like projections and grooves for meshing with an outer peripheral ribbed surface means of a rotatable pulley means, each projection of the belt construction having a generally V-shaped transverse cross-sectional configuration defined by two substantially straight side edges that converge from the respective apexes of the grooves of the belt construction that are on opposite sides of that projection to an apex of that projection, the side edges of each projection of the belt construction defining an angle of approximately 60° therebetween with the thickness of the belt construction being substantially the same as the thickness of a similar belt construction wherein the angle is approximately 40° and with the distance between the center lines of the grooves of the belt construction that are on opposite sides of that projection being larger than such distance of the similar belt construction.

Accordingly, it is an object of this invention to provide a new endless power transmission belt construction having one or more of the novel features of this invention as set forth above or hereinafter shown or described.

Another object of this invention is to provide a new method of making such an endless power transmission belt construction, the method of this invention having one or more of the novel features of this invention as set forth above or hereinafter shown or described.

Another object of this invention is to provide a new rotatable pulley means having one or more of the novel features of this invention as set forth above or hereinafter shown or described.

Another object of this invention is to provide a new method of making such a rotatable pulley means, the method of this invention having one or more of the novel features of this invention as set forth above or hereinafter shown or described.

Another object of this invention is to provide a new combination of an endless power transmission belt construction and a rotatable pulley means therefor, the combination of this invention having one or more of the novel features of this invention as set forth above or hereinafter shown or described.

Another object of this invention is to provide a new method of making such a combination, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
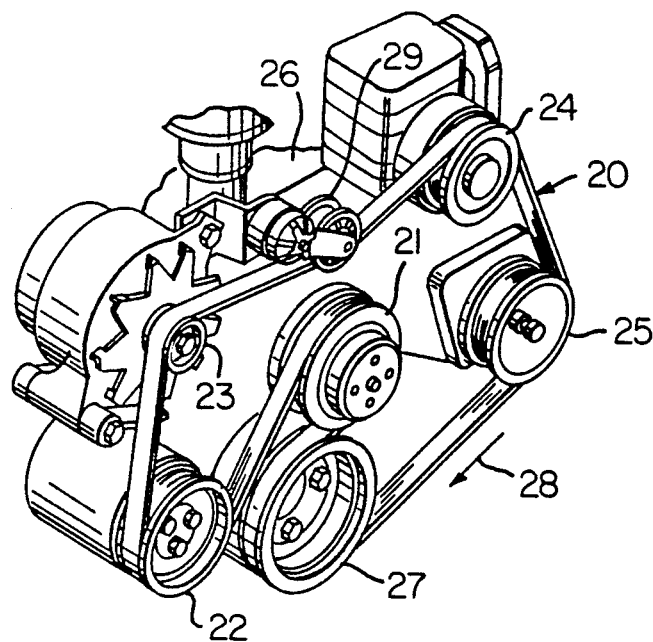
FIG. 1 a front perspective view of an automobile engine having an endless power transmission belt construction disposed in driving relation with a plurality of pulley means of the accessories engine as well as with the drive pulley means of engine.

While the various features of this invention are hereinafter illustrated and described as being particularly adapted to provide belt constructions and pulley means for use with internal combustion engines, it is to be understood that the various features of this invention can be utilized singly or in various combinations thereof to provide belt constructions and pulley means for other types of apparatus as desired.

Therefore, this invention is not to be limited to only the embodiments illustrated in the drawings because the drawings are merely utilized to illustrate one of the wide variety of uses of this invention.

Figure 3:
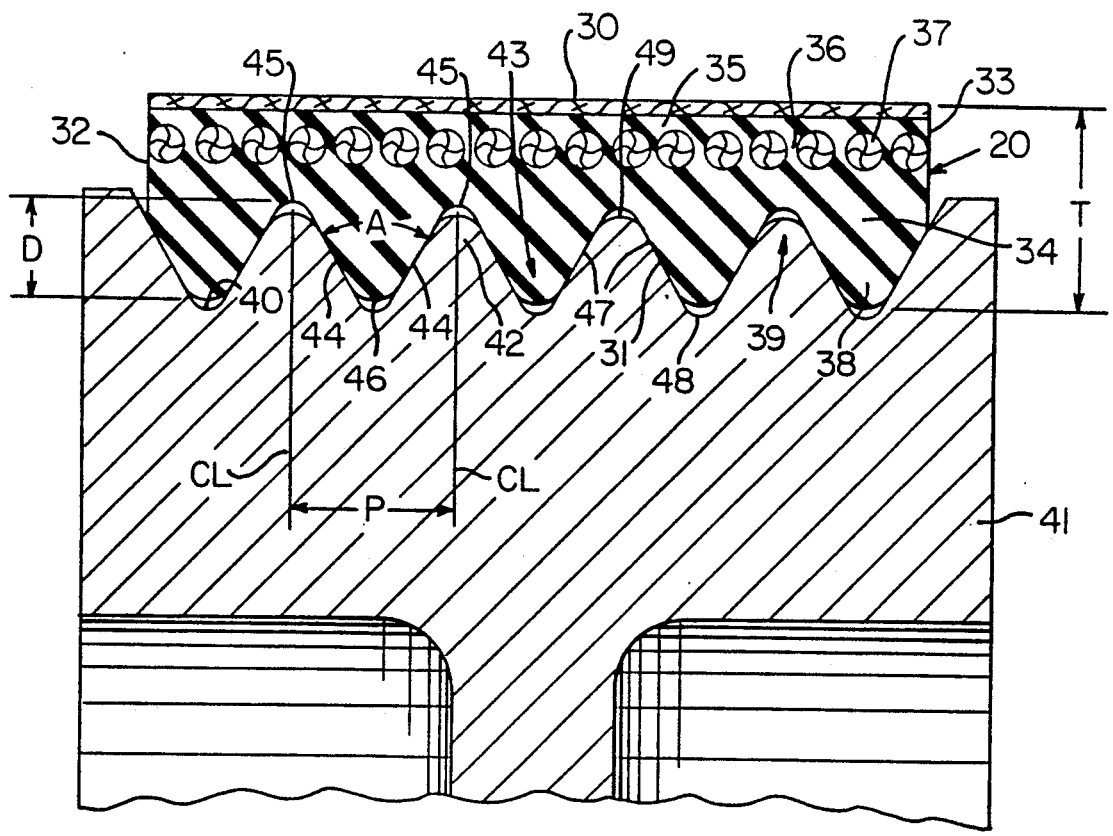
FIG. 3 is a transverse cross-sectional view similar to FIG. 2 and illustrating the new belt construction and pulley means of this invention.

Referring now to FIGS. 1 and 3, the new endless power transmission belt construction of this invention is indicated by the reference numeral 20 and is illustrated in FIG. 1 as being utilized for driving a plurality of sheaves or pulley means 21, 22, 23, 24 and 25 of accessory means of an internal combustion engine 26 of a suitable vehicle (not shown), such as an automobile, that has a driving sheave or pulley 27 interconnected to a crankshaft thereof and cooperating with the belt construction 20 for driving the belt construction 20 in the direction indicated by the arrow 28 in FIG. 1, the engine 26 having a suitable belt tensioning device 29 for tensioning the belt construction 20 in a manner well known in the art. For example, see the U.S. Pat. No. to Henderson, 4,784,631, which nor only illustrates and describes an internal combustion engine utilizing an endless power transmission belt in a manner similar to the belt construction 20 of this invention, but also illustrates and describes a tensioning means similar to the tensioning means 29 of FIG. 1 whereby this patent is being incorporated into this disclosure by this reference thereto.

As illustrated in FIG. 3, the belt construction 20 of this invention has an outer surface means 30 and an inner surface means 31 respectively extending between opposed substantially flat parallel side edge means 32 and 33 thereof, the belt construction 20 having been made by any well known suitable method and from any well known suitable materials so as to define an inner compression section 34, an outer tension section 35 and an intermediate load carrying section with the load carrying section 36 including a cord means 37 all as well known in the art. For example, see the aforementioned U.S. Pat. Nos. to Adams, Jr., 2,728,239; to Semin et al, 3,643,518; to Fisher et al, 3,951,006; to Speer, 4,047,446; to Fischer, 4,330,287, to Tanaka et al, 4,525,158 and to Hull, 4,647,278, wherein belt constructions similar to the belt construction 20 of this invention are fully disclosed whereby these seven patents are also being incorporated into this disclosure by this reference thereto.

Figure 4:
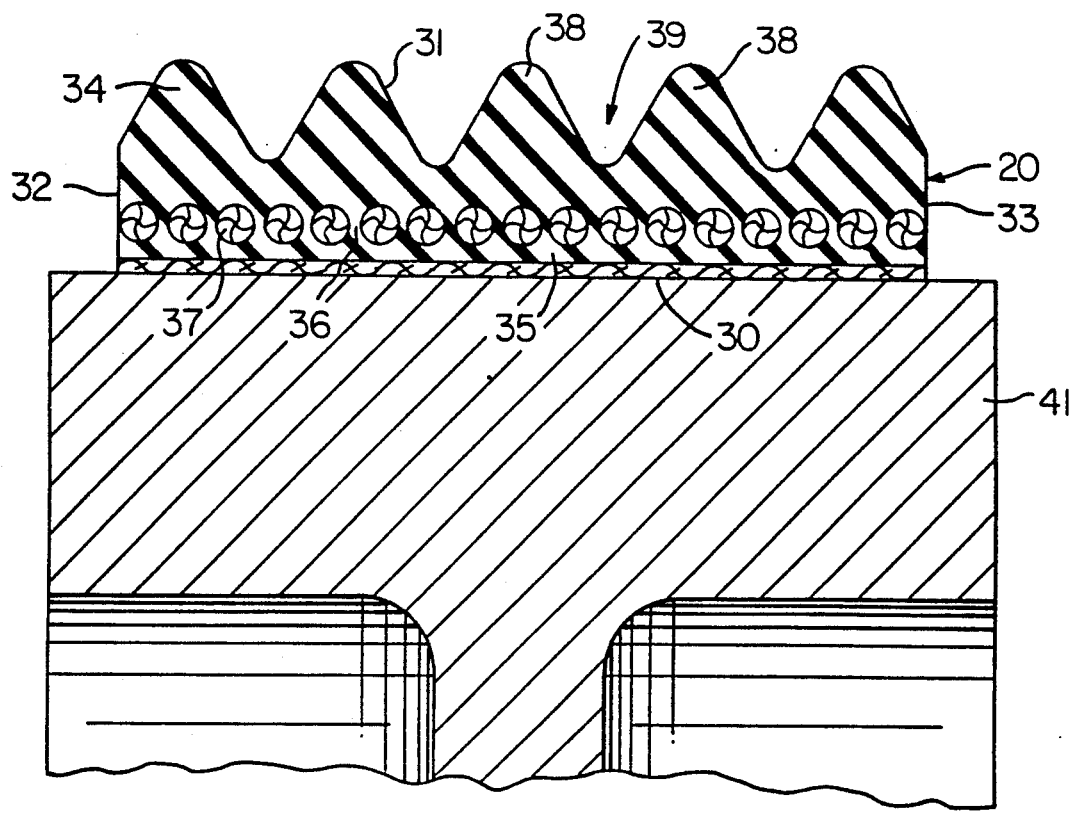
FIG. 4 is a view similar to FIG. 3 and illustrates the belt construction of this invention having the nonribbed surface means cooperating with a nonribbed surface of a pulley means.

Therefore, since the details of the structure, materials and methods of forming endless power transmission belt constructions for driving pulley means of a vehicle engine system by the inner surface means 31 thereof as illustrated in FIG. 3 and by the outer surface means 30 thereof as illustrated in FIG. 4 are well known in the art, only the details of the belt construction 20 of this invention that are necessary to understand the unique features of this invention will now be set forth.

As illustrated in FIG. 3, the inner surface means 31 of the belt construction 20 defines a plurality of longitudinally disposed and alternately spaced apart like and parallel projections 38 and grooves 39 that are adapted to respectively have portions thereof mesh with an outer peripheral ribbed surface means 40 of a rotatable pulley means 41, such as one of the pulley means 21–27 illustrated in FIG. 1, to provide a driving relationship therewith as is well known in the art, the outer peripheral ribbed surface means 40 of the pulley means 41 also defining a plurality of longitudinally disposed and alternately spaced apart like and parallel projections 42 and grooves 43 that respectively have portions thereof for serially meshing respectively with cooperating portions of the grooves 39 and projections 38 of the belt construction 20.

Each projection 38 of the belt construction 20 of this invention has a generally V-shaped transverse cross-sectional configuration as illustrated in FIG. 3 defined by two substantially straight side edges 44 that converge from respective apexes 45 of the grooves 39 of the belt construction 20 that are on opposite sides of that projection 38 to an apex 46 of that projection 38, the side edges 44 of each projection 38 of the belt construction 20 defining an angle A therebetween of approximately 60° while the thickness T of the belt construction 20 is substantially the same as the thickness of a similar belt construction wherein the V angle thereof is approximately 40° and with a distance P between the center lines CL of the grooves 39 of the belt construction 20 that are on opposite sides of that projection 38 being larger than such distance of the similar belt construction. In addition, the depth D of each groove 39 of the belt construction 20 is substantially the same as such depth of such similar belt construction.

Figure 2:
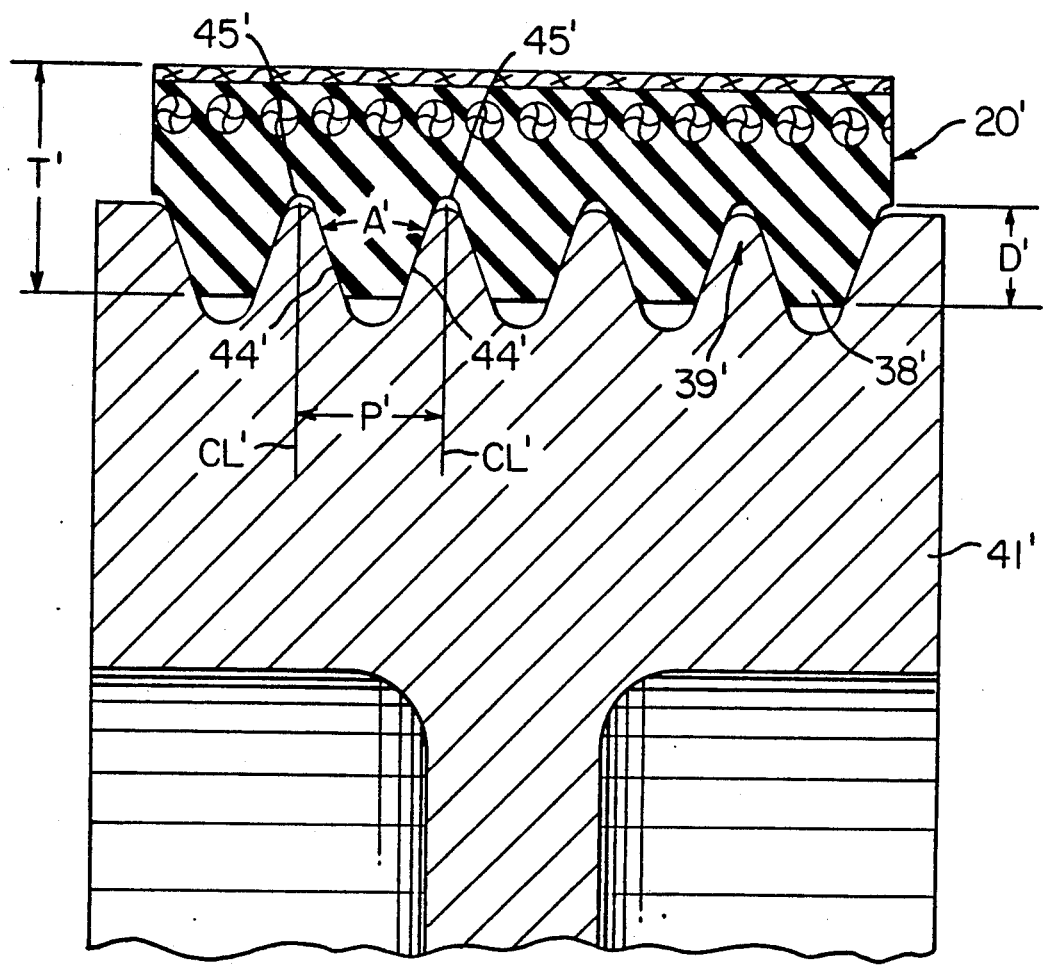
FIG. 2 is an enlarged transverse cross-sectional configuration of a prior known V-ribbed belt construction cooperating with pulley means therefor.

In particular, reference is now made to FIG. 2 wherein the prior known V-ribbed belt construction is indicated by the reference numeral 20' and parts thereof similar to the belt construction 20 of this invention previously set forth are indicated by like reference numerals followed by a prime mark.

As illustrated in FIG. 2, the prior known belt construction 20' is formed so that the angle A' that is defined between the flat converging side edges 44' of each projection 38' thereof is approximately 40°. While such belt construction 20' can have any desired number of projections 38', conventionally such belt construction 20' for vehicle use has anywhere from three to eight projections 38' with the thickness T' of the belt construction 20' being approximately 0.206 of an inch, the depth D' of each groove 39' being approximately 0.095 of an inch and the distance p' between the center lines CL' through the apexes 45' of adjacent grooves 39' being approximately 0.140 of an inch.

In contrast, it is believed according to the teachings of this invention that while the thickness T and depth D for the belt construction 20 of this invention can be substantially the same as the belt construction 20', the angle A for the projections 38 should be approximately 60° and the distance P should be greater than the distance P' so that the resulting belt construction 20 of this invention will have greatly improved results over the belt construction 20' when the belt construction 20 is utilized with the pulley 41 of this invention that has the projections 42 and grooves 43 thereof formed to be compatible with the projections 38 and grooves 39 of the belt construction 20 as illustrated in FIG. 3 wherein the angle between the converging side edges 47 of each projection 45 on the pulley means 41 is also approximately 60° as the side edges 47 of each projection 42 converge from the apexes 48 of the grooves 43 on opposite sides of that projection 42 to the apex 49 of that projection 42.

Thus, it can be seen that in one embodiment of the belt construction 20 of this invention, the same has a thickness T of approximately 0.206 of an inch, a depth D for the grooves 39 of approximately 0.095 of an inch while the distance P between adjacent center lines CL of adjacent grooves 39 is approximately 0.170 of an inch.

In this manner, it is believed that such a belt construction 20 of this invention will create less belt noise with its pulleys than the belt construction 20', accumulate less material between the ribs or projections 38 thereof than the belt construction 20' and will have less tension decay when used on drives not utilizing a belt tensioner than the belt construction 20'.

The above is believed to occur by the belt construction 20 of this invention having a wider rib angle A and a larger radius at the root or apex 45 of each projection 38 as well as an increased rib pitch P while maintaining the same belt thickness T as the belt construction 20' and while maintaining the same depth D of the grooves 39 as the belt construction 20' so that the belt flex properties the same as the belt flex properties of the belt construction 20'.

For example, in the one embodiment of the belt construction 20 of this invention as illustrated in FIG. 3, the apexes 45 of the grooves 39 are each defined by a radius of approximately 0.019 of an inch with the apex 46 of each projection 38 being defined by a radius of approximately 0.033 of an inch. In contrast, the apexes 45' of the grooves 39' of the belt construction 20' are each defined by a radius of 0.012 of an inch.

Thus, it can be seen that it is believed according to the teachings of this invention that a person can take the basic dimensions of a conventional 40° ribbed belt construction and utilize a 60° rib angle therewith so as to provide for a wider pitch or distance P and a larger radius for defining the apexes 45 of the grooves 39 to provide reduced tension decay on locked center drives, less sensitivity to drive misalignment, and a stiffer rib 38 than a 40° rib. And since noise is the result of vibration, it is believed that the 60° ribbed belt construction of this invention should be quieter than the 40° ribbed belt construction.

In addition, the wider rib pitch P of the belt construction of this invention results in fewer grooves per given belt top width with the resulting radius at the roots 45 of each rib 38 being relatively large so that it is more difficult for material to wedge in the roots 45 of the teeth 38 and the task of cleaning the belt construction 20 of this invention with such larger radius at the roots 45 is believed to be much easier.

For example, it is believed that when the belt construction 20 of this invention has five 60° ribs 38 and has the previously set forth dimensions, the same can replace a similar belt construction 20' that has six 40° ribs 38' as such belt construction 20 will have a width of approximately 0.850 of an inch whereas such replaced belt construction 20' will have a width of approximately 0.840 of an inch. Similarly, it is believed that a belt construction 20 of this invention having four 60° ribs 38 will have a belt width of approximately 0.680 of an inch and will replace a similar belt construction 20' having five 40° ribs 38' and a belt width of approximately 0.700 of an inch. In addition, it is believed that a belt construction 20 of this invention that has three 60° ribs 38 will have a belt width of approximately 0.510 of an inch and will replace a similar belt construction 20' having four 40° ribs 38' and a belt width of approximately 0.560 of an inch.

Therefore, it is also believed that any of the standard V-ribbed belts with the cross sections H, J, K, L and M as set forth in the Rubber Manufacturers' Association Engineering Standards book IP-26 (1977), such as set forth on page 4 thereof, could be modified according to the teachings of this invention to provide for the improved functions previously set forth whereby this Engineering Standards book is being incorporated into this disclosure by this reference thereto.

As previously stated, it is also a feature of this invention to provide a new pulley means for cooperating with the belt construction 20 of this invention and such new pulley means is the pulley means 41 illustrated in FIG. 3 wherein the angle between the adjacent sides 47 of each projection 42 is approximately 60° as previously set forth. Each apex 49 of each projection 42 of the pulley 41 is defined by a radius that is approximately 0.030 of an inch while the apex 48 of each groove 43 thereof is defined by a radius of approximately 0.020 of an inch.

It is believed that such pulley means 41 of this invention will have a reduced cost over the pulley means 41' for the belt construction 20' due to larger radii and fewer ribs as such pulley means 41 could be quality made by being spun/rolled.

While the distance P for the belt construction 20 has been previously described as being approximately 0.170 of an inch, the outer projections 38 that define the side edges 32 and 33 of the belt construction 20 have been trimmed so that the distance from the center line CL of a groove 39 adjacent to the outermost projection 38 to the respective side edge 32 or 33 is approximately 0.152 of an inch in order to permit the belt construction 20 to properly ride on the pulley means 41, such trimming to form the side edges 32 and 33 being a feature that is well known in the art.

Figure 5:
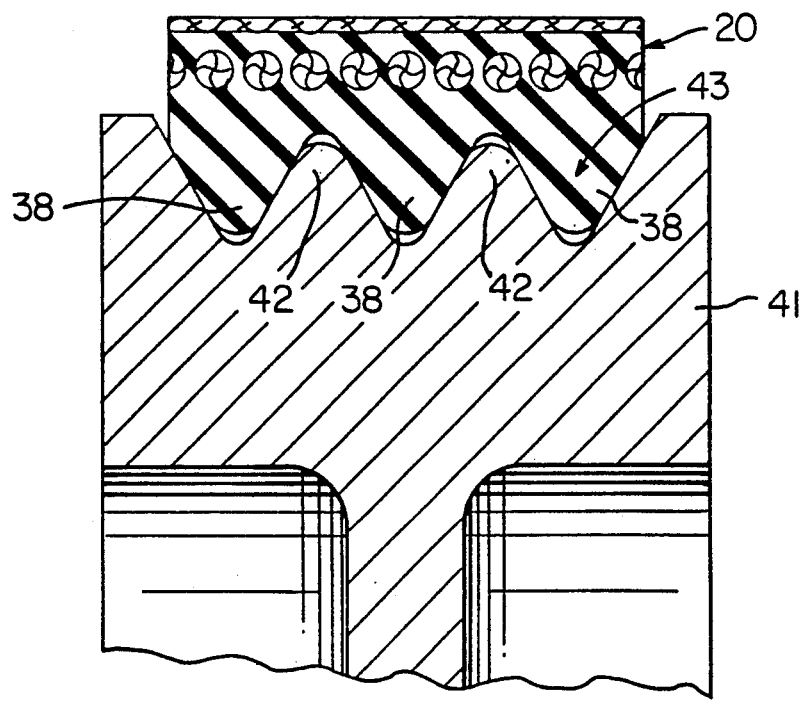
FIG. 5 is a view similar to FIG. 3 and illustrates another belt construction of this invention in combination with another pulley means of this invention wherein the number of V-ribs on the belt construction is less than the number of V-ribs on the belt construction of FIG. 3.

Also, while the belt construction 20 of this invention has five projections 38, it is to be understood that the belt construction 20 can have any desired number of projections 38 and the cooperating pulley means 41 of this invention would have a similar number of grooves 43 and projections 42. For example, see FIG. 5 wherein the belt construction 20 has three projections 38 and the pulley means 41 has two projections 42.

Therefore, it can be seen that this invention not only provides a new belt construction and pulley means therefor, but also this invention provides a new combination of such belt construction and pulley means and new methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a rotatable pulley means having an outer peripheral ribbed surface means for meshing with a portion of a ribbed inner surface means of an endless power transmission belt construction, said ribbed surface means of said pulley means defining a plurality of longitudinally disposed and alternately spaced apart like projections and grooves, each projection of said pulley means having a generally V-shaped transverse cross-sectional configuration defined by two substantially straight side edges that converge from the respective apexes of said grooves of said pulley means that are on opposite sides of that projection to an apex of that projection, the improvement wherein said side edges of each said projection of said pulley construction define an angle of approximately 60° therebetween with the height thereof being approximately 0.095 of an inch and with the pitch of said projection being approximately 0.170 of an inch.

2. In the method of making a rotatable pulley means having an outer peripheral ribbed surface means for meshing with a portion of a ribbed inner surface means of an endless power transmission belt construction, said ribbed surface means of said pulley means defining a plurality of longitudinally disposed and alternately spaced apart like projections and grooves, said method comprising the step of forming each projection of said pulley means to have a generally V-shaped transverse cross-sectional configuration defined by two substantially straight side edges that converge from the respective apexes of said grooves of said pulley means that are on opposite sides of that projection to an apex of that projection, the improvement comprising the step of forming said side edges of each said projection of said pulley construction to define an angle of approximately 60° therebetween with the height thereof being approximately 0.095 of an inch and with the pitch of said projection being approximately 0.170 of an inch.

* * * * *